United States Patent [19]

Harunah

[11] Patent Number: 5,759,040

[45] Date of Patent: Jun. 2, 1998

[54] SYSTEM FOR LOCATING VARIOUS ENTITIES ON A MAP

[76] Inventor: Abdul A. Harunah, 56 Aspen Dr., North Brunswick, N.J. 08902

[21] Appl. No.: 872,873

[22] Filed: Jun. 11, 1997

[51] Int. Cl.$^6$ .................................. G09B 29/10
[52] U.S. Cl. ............................ 434/153; 434/150
[58] Field of Search ..................... 434/150, 151, 434/152, 153, 431

[56] References Cited

U.S. PATENT DOCUMENTS

| | | | |
|---|---|---|---|
| 1,510,110 | 9/1924 | Schmidt | 434/150 |
| 1,587,506 | 6/1926 | Charlton | 434/157 |
| 1,597,562 | 8/1926 | Allen | 434/150 |
| 2,503,126 | 4/1950 | Muldrow III et al. | 434/150 |
| 2,789,372 | 4/1957 | Ribak | 434/153 |
| 2,809,447 | 10/1957 | Amsterdam | 434/153 |
| 2,889,638 | 6/1959 | Anderson | 434/150 |
| 3,023,519 | 3/1962 | Levin | 434/150 |
| 4,978,302 | 12/1990 | Clossey | 434/153 |
| 5,275,568 | 1/1994 | Pfuetze | 434/150 |

FOREIGN PATENT DOCUMENTS

| | | | |
|---|---|---|---|
| 68989 | 3/1991 | Japan | 434/153 |
| 5204306 | 8/1993 | Japan | 434/153 |

*Primary Examiner*—Paul J. Hirsch

[57] ABSTRACT

A system for locating various entities on a map is provided comprising at least one map page having a map printed thereon. Each map page includes indicia representative of streets printed thereon. Further provided is a transparent sheet having a plurality of horizontal and vertical intersecting lines printed thereon for defining a matrix of boxes with a plurality of rows. Each square has a small indicia printed thereon. Next provided is at least one index page associated with each map page. The index page includes names of a plurality of streets which are depicted on the associated map page printed thereon in alphabetical order and a small printed adjacent each street. Each small indicia corresponds with that of the box of the transparent sheet that contains the associated street when the transparent sheet is situated on the corresponding map page.

8 Claims, 2 Drawing Sheets

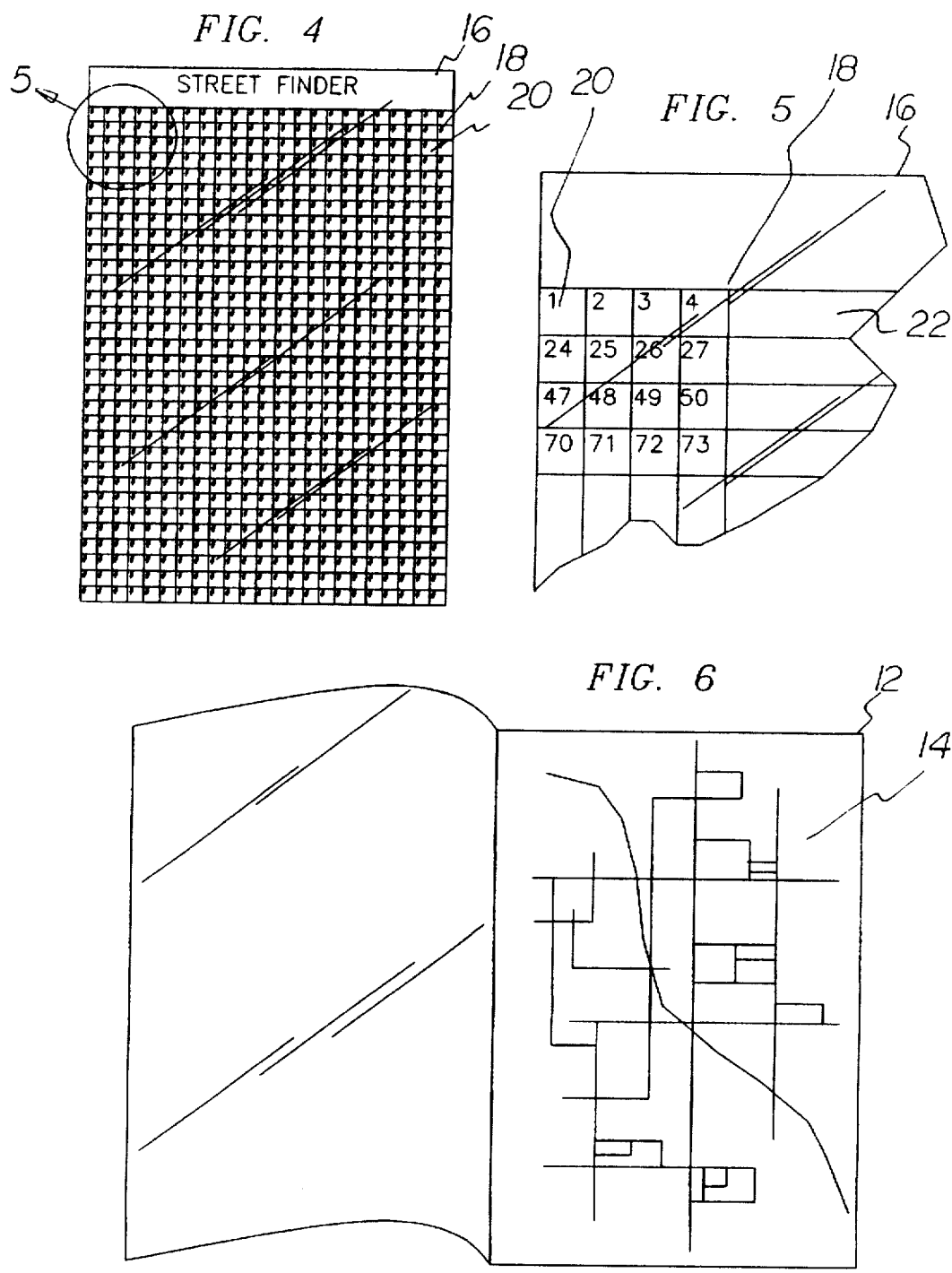

SYSTEM FOR LOCATING VARIOUS ENTITIES ON A MAP

BACKGROUND OF THE INVENTION

1. Field of the Invention

The present invention relates to a system for locating various entities on a map and more particularly pertains to allowing the viewing of map with or without a transparent locator sheet situated thereon.

2. Description of the Prior Art

The use of map grids is known in the prior art. More specifically, map grids heretofore devised and utilized for the purpose of locating streets and cities on a map are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. Nos. 5,362,239; 5,445,524; U.S. Pat. No. Des. 335,262; U.S. Pat. Nos. 4,836,785; and 4,934,741.

In this respect, the system for locating various entities on a map according to the present invention substantially departs from the conventional concepts and designs of the prior art, and in so doing provides an apparatus primarily developed for the purpose of allowing the viewing of map with or without a transparent locator grid situated thereon.

Therefore, it can be appreciated that there exists a continuing need for a new and improved system for locating various entities on a map which can be used for allowing the viewing of map with or without a transparent locator grid situated thereon. In this regard, the present invention substantially fulfills this need.

SUMMARY OF THE INVENTION

In view of the foregoing disadvantages inherent in the known types of map grids now present in the prior art, the present invention provides an improved system for locating various entities on a map. As such, the general purpose of the present invention, which will be described subsequently in greater detail, is to provide a new and improved system for locating various entities on a map which has all the advantages of the prior art and none of the disadvantages.

To attain this, the present invention essentially comprises a plurality of map pages. Note FIG. 6. Each map page has a map printed thereon. Such map includes indicia representative of cities and streets printed thereon. Also included is a separate loose transparent sheet having a size equal to that of the map pages. The transparent sheet includes a plurality of horizontal and vertical intersecting lines printed thereon, as shown in FIG. 4. Such lines serve to define a matrix of square boxes forming a plurality of rows. It should be noted that each square has a small numeral printed in an upper left hand corner thereof. The numerals of the boxes of each row increase in order from left to right. Next provided is a plurality of index pages associated with each map page. Note FIGS. 2 & 3. The plurality of index pages associated with each map page include at least one city page having a first column with names of a plurality of the cities depicted on the associated map page. Preferably, the names are situated in alphabetical order from top to bottom. Each city page further has a second column having numerals printed thereon adjacent an associated city. It should be understood that each of the aforementioned numerals correspond with that of the box of the transparent sheet that contains the associated city when the transparent sheet is situated on the corresponding map page. Each index page further includes at least one street page having a first column with names of a plurality of streets which are depicted on the associated map page. Similar to those of the city pages, the names of the streets are in alphabetical order. Associated with the first column is a second column having numerals printed thereon and each situated adjacent an associated street. Each numeral corresponds with that of the box of the transparent sheet that contains the associated street when the transparent sheet is situated on the corresponding map page.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved system for locating various entities on a map which has all the advantages of the prior art map grids and none of the disadvantages.

It is another object of the present invention to provide a new and improved system for locating various entities on a map which may be easily and efficiently manufactured and marketed.

It is a further object of the present invention to provide a new and improved system for locating various entities on a map which is of a durable and reliable construction.

An even further object of the present invention is to provide a new and improved system for locating various entities on a map which is susceptible of a low cost of manufacture with regard to both materials and labor, and which accordingly is then susceptible of low prices of sale to the consuming public, thereby making such system for locating various entities on a map economically available to the buying public.

Still yet another object of the present invention is to provide a new and improved system for locating various entities on a map which provides in the apparatuses and methods of the prior art some of the advantages thereof, while simultaneously overcoming some of the disadvantages normally associated therewith.

Still another object of the present invention is to allow the viewing of map with or without a transparent locator grid situated thereon.

Lastly, it is an object of the present invention to provide a new and improved system for locating various entities on a map is provided comprising at least one map page having a map printed thereon. Each map page includes indicia representative of streets printed thereon. Further provided is a transparent sheet having a plurality of horizontal and vertical intersecting lines printed thereon for defining a matrix of boxes with a plurality of rows. Each square has a small indicia printed thereon. Next provided is at least one index page associated with each map page. The index page includes names of a plurality of streets which are depicted on the associated map page printed thereon in alphabetical order and a small printed adjacent each street. Each small indicia corresponds with that of the box of the transparent sheet that contains the associated street when the transparent sheet is situated on the corresponding map page.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a front view of the transparent sheet of the present invention.

FIG. 5 is a close-up view of the boxes and associated numerals of the transparent sheet shown in FIG. 4.

FIG. 6 is an illustration of one of the map pages of the present invention.

Similar reference characters refer to similar parts throughout the several views of the drawings.

DESCRIPTION OF THE PREFERRED EMBODIMENT

Figure 1:
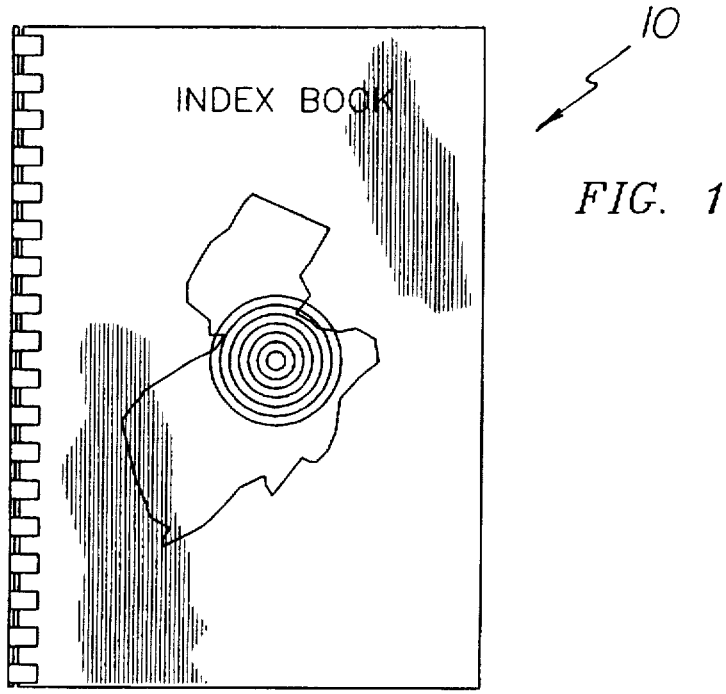
FIG. 1 is an illustration of the preferred embodiment of the system for locating various entities on a map constructed in accordance with the principles of the present invention.

With reference now to the drawings, and in particular to FIG. 1 thereof, a new and improved system for locating various entities on a map embodying the principles and concepts of the present invention and generally designated by the reference numeral 10 will be described.

The present invention, the new and improved system for locating various entities on a map, is comprised of a plurality of components. Such components in their broadest context include a plurality of map and index pages and a transparent locator sheet. Such components are individually configured and correlated with respect to each other so as to attain the desired objective.

More specifically, it will be noted that system 10 of the present invention includes a plurality of map pages 12. Note FIG. 6. Each map page has a map 14 printed thereon. Such map includes indicia 16 representative of cities and streets printed thereon.

Also included is a separate loose transparent locator sheet 16 having a size equal to that of the map pages. The transparent sheet includes a plurality of horizontal and vertical intersecting lines 18 printed thereon, as shown in FIG. 4. Such lines serve to define a matrix of 726 square boxes 20 forming a plurality of rows 22. It should be noted that each square box has a small numeral printed in an upper left hand corner thereof. In the preferred embodiment, each box is 1 cm by 1 cm. The numerals of the boxes of each row increase in order from left to right. In an alternative embodiment, a plurality of transparent sheets are included and the sheets are each coupled along a top or side edge thereof with that of an associated map page.

Figure 2:
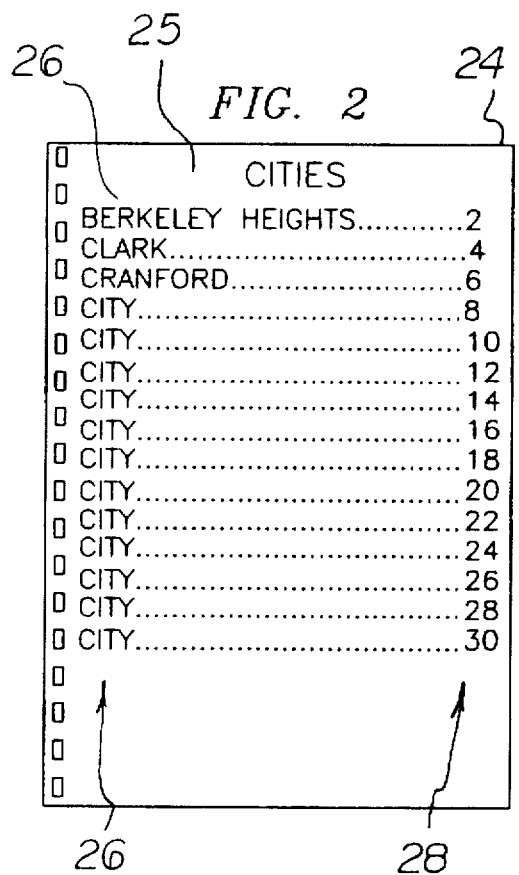
FIG. 2 is a front view of one of the city pages of the index pages.
Figure 3:
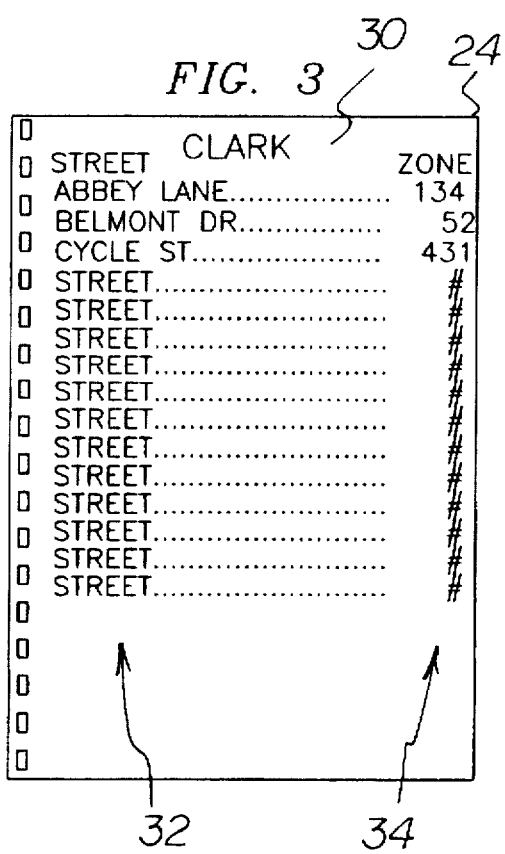
FIG. 3 is a front view of one of the street pages of the index pages.

Next provided is a plurality of index pages 24 associated with a corresponding map page. Note FIGS. 2 & 3. In the alternative, the index pages may correspond to all of the map pages. The plurality of index pages associated with each map page include at least one city page 25 having a first column 26 with names of a plurality of the cities depicted on the associated map page. Preferably, the names are situated in alphabetical order from top to bottom. Each city page further has a second column 28 having numerals each printed thereon adjacent an associated city. It should be understood that each of the aforementioned numerals correspond with that of the box of the transparent sheet that contains the associated city when the transparent sheet is situated on the corresponding map page.

Each index page further includes at least one street page 30 having a first column 32 with names of a plurality of streets which are depicted on the associated map page. Similar to those of the city pages, the names of the streets are in alphabetical order. Associated with the first column is a second column 34 having numerals printed thereon and each situated adjacent an associated street. Each numeral corresponds with that of the box of the transparent sheet that contains the associated street when the transparent sheet is situated on the corresponding map page. Preferably, the map pages and index pages form a book, as shown in FIG. 1.

It should be noted that in an alternate embodiment, the present invention may be utilized to locate other entities such as landmarks and the like. Further, the index pages may take the form of a rolodex or a small computerized organizer. In such embodiment, a plurality of transparent sheet may be included to be used with various maps.

The method associated with the present invention will now be described. First, a user places the transparent sheet on one of the map pages. Next, the user locates at least one of the cities and streets in the index pages. The numeral adjacent the city or street from the previous step is then read. Thereafter, the box with the numeral from the previous step is located on the transparent sheet. Lastly, the city or street is located within the box.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved system for locating various entities on a map comprising, in combination:
   a plurality of map pages each map page having a map printed thereon, each map page including indicia representative of cities and streets printed thereon;
   a separate loose transparent sheet having a size equal to that of the map pages, the transparent sheet having a plurality of horizontal and vertical intersecting lines printed thereon for defining a matrix of square boxes forming a plurality of rows, each square box having a small numeral printed in an upper left hand corner thereof, wherein the numerals of the boxes of each row increases in order from left to right; and
   a plurality of index pages associated with each map page, the plurality of index pages associated with each map page including at least one city page having a first column with names of a plurality of cities depicted on the associated map page printed thereon in alphabetical order and a second column having numerals printed thereon adjacent an associated city, each numeral corresponding with that of the box of the transparent sheet that contains the associated city when the transparent sheet is situated on the corresponding map page, each index page further including at least one street page having a first column with names of a plurality of streets which are depicted on the associated map page printed thereon in alphabetical order and a second column having numerals printed thereon adjacent an associated street, each numeral corresponding with that of the box of the transparent sheet that contains the associated street when the transparent sheet is situated on the corresponding map page.

2. A system for locating various entities on a map comprising:
   at least one map page having a map printed thereon, each map page including indicia representative of streets printed thereon;
   a transparent sheet having a plurality of horizontal and vertical intersecting lines printed thereon for defining a matrix of boxes forming a plurality of rows, each square box having a small indicia printed thereon; and
   at least one index means including names of a plurality of streets which are depicted on the associated map page printed thereon in alphabetical order and a small indicia printed thereon adjacent each street, each small indicia corresponding with that of the box of the transparent sheet that contains the associated street when the transparent sheet is situated on the corresponding map page.

3. A system for locating various entities on a map as set forth in claim 2 wherein the transparent sheet has a size equal to that of each map page.

4. A system for locating various entities on a map as set forth in claim 2 wherein the transparent sheet is coupled along an edge thereof to an edge of the map page.

5. A system for locating various entities on a map as set forth in claim 2 wherein the transparent sheet is loose and separate from the map page.

6. A system for locating various entities on a map as set forth in claim 2 wherein the small indicia of the transparent sheet and index means is a numeral.

7. A system for locating various entities on a map as set forth in claim 6 wherein the numerals of the boxes of each row increases in order from left to right.

8. A method of locating a street or city on a map:
   providing a plurality of map pages each map page having a map printed thereon, each map page including indicia representative of cities and streets printed thereon;
   providing a separate loose transparent sheet having a size equal to that of the map pages, the transparent sheet having a plurality of horizontal and vertical intersecting lines printed thereon for defining a matrix of square boxes forming a plurality of rows, each square box having a small numeral printed in an upper left hand corner thereof, wherein the numerals of the boxes of each row increases in order from left to right;
   providing a plurality of index pages associated with each map page, the plurality of index pages associated with each map page including at least one city page having a first column with names of a plurality of cities depicted on the associated map page printed thereon in alphabetical order and a second column having numerals printed thereon adjacent an associated city, each numeral corresponding with that of the box of the transparent sheet that contains the associated city when the transparent sheet is situated on the corresponding map page, the plurality of index pages further including at least one street page having a first column with names of a plurality of streets which are depicted on the associated map page printed thereon in alphabetical order and a second column having numerals printed thereon adjacent an associated street, each numeral corresponding with that of the box of the transparent sheet that contains the associated street when the transparent sheet is situated on the corresponding map page;
   placing the transparent sheet on one of the map pages;
   locating at least one of the cities and streets in the index pages;
   reading the numeral adjacent the city or street from the previous step;
   locating the box on the transparent sheet with the numeral from the previous step; and
   finding the city or street within the box from the previous step.

* * * * *